United States Patent [19]

Sanada

[11] Patent Number: 5,494,642
[45] Date of Patent: Feb. 27, 1996

[54] ELECTRICALLY HEATED CATALYTIC CONVERTER FOR AN ENGINE

[75] Inventor: Masakatsu Sanada, Numazu, Japan

[73] Assignee: Toyota Jidosha Kabushiki Kaisha, Toyota, Japan

[21] Appl. No.: 361,261

[22] Filed: Dec. 21, 1994

[30] Foreign Application Priority Data

Dec. 28, 1993 [JP] Japan .................................. 5-336028

[51] Int. Cl.⁶ .................................................... F01N 3/28
[52] U.S. Cl. ..................... 422/174; 422/179; 422/180; 422/199; 422/221; 422/222; 60/300; 502/527; 219/552; 219/553; 392/485; 392/488
[58] Field of Search .................................. 422/173, 174, 422/177, 180, 179, 198, 199; 60/300, 299, 303; 502/439, 527; 219/552, 553, 505, 534, 536, 548, 546; 392/491, 494, 485, 488

[56] References Cited

U.S. PATENT DOCUMENTS

| | | | |
|---|---|---|---|
| 4,795,615 | 1/1989 | Cyron et al. | 422/179 |
| 5,079,210 | 1/1992 | Kaji et al. | 502/439 |
| 5,116,581 | 5/1992 | Cyron et al. | 422/180 |
| 5,271,906 | 12/1993 | Yuuki et al. | 422/177 |
| 5,272,875 | 12/1993 | Kaj | 422/179 |
| 5,317,869 | 6/1994 | Takeuchi | 422/174 |

FOREIGN PATENT DOCUMENTS

| | | |
|---|---|---|
| 590596 | 6/1994 | European Pat. Off. . |
| 4-27443 | 1/1992 | Japan . |
| 4-203416 | 7/1992 | Japan . |
| 2-280842 | 11/1993 | Japan . |

Primary Examiner—Robert J. Warden
Assistant Examiner—Hien Tran
Attorney, Agent, or Firm—Kenyon & Kenyon

[57] ABSTRACT

An electrically heated catalytic converter having a substrate for a catalyst which is formed as a scroll-like cylindrical laminated assembly, a rod like metal center electrode connected to the laminated assembly, and a casing accommodating the laminated assembly which also acts as an outer electrode. The center electrode extends from the laminated assembly along the central axis, bends towards the wall of the casing and penetrates the casing. The center electrode is fixed to the casing via an insulating material at the point where it penetrates the casing. Four buffer members are interposed between the laminated assembly and the casing, each of buffer members being made of a metal plate, one end of the respective buffer members being fixed to the casing at the portion near the penetration point of the center electrode, the other end of the respective buffer members being fixed to the outside of the laminated assembly. During the operation of the engine, the laminated assembly is displaced by the thermal expansion of the center electrode. In the present invention, thermal expansions also occurs in each of the buffer members. Since the ends of the buffer members are fixed near to the penetration point at which the center electrode is fixed to the casing, the amounts of the displacements of the other ends of the buffer members where the buffer members are fixed to the laminated assembly are equal to the displacement of the laminated assembly caused by the thermal expansion of the center electrode. Therefore, the displacement of the laminated assembly is not hindered by the buffer members. Thus, the buffer members support the laminated assembly without causing excessive stress in the laminated assembly.

4 Claims, 5 Drawing Sheets

ELECTRICALLY HEATED CATALYTIC CONVERTER FOR AN ENGINE

BACKGROUND OF THE INVENTION

1. Field of the Invention

The present invention relates to an electrically heated catalytic converter having a substrate of a catalyst formed as a scroll-like cylindrical laminated assembly of thin metal sheets and, more specifically, relates to a support construction for such a substrate.

2. Description of the Related Art

An exhaust gas purification device that utilizes a three-way reducing and oxidizing catalytic converter disposed in the exhaust passage of an internal combustion engine is commonly used. Generally, the catalyst used in such converters is able to purify pollutants such as HC, CO and $NO_x$ in the exhaust gas only when the temperature of the catalyst becomes higher than a certain temperature, i.e., the catalysts in the converter do not work when the temperature of the catalyst is lower than an activating temperature.

To shorten the time required for the catalyst to reach the activating temperature after the engine starts, electrically heated catalytic converters are used. Usually, electrically heated catalytic converters have metal substrates, and the catalyst is heated during engine start by feeding an electric current through the metal substrates, i.e., by using the metal substrates as electric heaters.

An electrically heated catalytic converter of this type is disclosed, for example, in Japanese Unexamined Patent Publication (Kokai) No. 4-203416. The electrically heated catalytic converter disclosed in JPP '416 has a substrate formed as a scroll-like cylindrical laminated assembly of thin metal sheets.

More specifically, the substrate in JPP '416 comprises a thin plain metal sheet and a thin corrugated metal sheet both provided with insulating coatings on the surfaces. The plain metal sheet and the corrugated metal sheet are placed one upon another and wound around a common center electrode so that the plain metal sheet and the corrugated metal sheet form a scroll-like cylinder of laminated metal sheets. The cylindrical laminated assembly is accommodated in a cylindrical metal casing. The center electrode extends from the laminated assembly in the direction of the central axis of the laminated assembly and is bent toward a radial direction so that the electrode penetrates the wall of the casing. The center electrode is fixed to the casing at the portion where it penetrates the wall of the casing, in such manner that the electrode and the casing are electrically isolated. The cylindrical outer surface of the laminated assembly is connected to the casing in such manner that the laminated assembly and the casing are electrically connected.

When electric voltage is applied across the center electrode and the metal casing, electric current flows through the metal sheets in the laminated assembly. The metal sheets are heated by this electric current and reach the activating temperature of the catalyst a short time after the engine starts.

In a catalytic converter equipped with the substrate disposed in the casing, as disclosed in JPP '416, the substrate must be fixed firmly to the casing to protect the substrate from damage caused by vibration during the operation of the engine. However, since the substrate and the casing are exposed to high temperature exhaust gas, if the substrate is fixed to the casing, an excessive stress may be exerted on the substrate due to the difference in the thermal expansion of the substrate and the casing during engine operation.

To avoid this problem, Japanese Unexamined Patent Publication (Kokai) No. 62-30533 discloses a support construction for the substrate which is capable of absorbing the difference in the thermal expansion of the substrate and the casing. The support construction disclosed in the JPP '533 is applied to a substrate which has no center electrode. In this support construction, a plurality of collar like separating members are disposed between the substrate and the casing. The outer circumferences of the separating members are fixed firmly to the inner surface of the cylindrical casing and the inner circumferences of the separating members contact the outer surface of the substrates while allowing an axial sliding movement of the substrate.

The annular space defined by the separation members is filled with an insulating material (such as quartz sand) which acts as a buffer between the substrate and the casing.

In this support construction, the substrate is supported firmly by the quartz sand, and the difference in the thermal expansions of the substrate and the casing is absorbed by the sliding contact between the separation members and the substrate.

However, problems arise when the support construction in the JPP '533 is applied to a substrate formed as a scroll-like cylindrical laminated assembly with a center electrode such as disclosed in the JPP '416.

In the scroll-like cylindrical laminated assembly type substrate, the outer cylindrical surface of the substrate must be connected to the inner surface of the casing so that an electric current can flow through the connection without resistance. However, in the JPP '533, the connection between the substrate and the casing is made only by contact between the substrate and the separating members. Since the electrical resistance of the contact points is high, it is difficult to supply sufficient electricity, for heating the substrate to the activating temperature in a short time, through these contact points.

On the other hand, if the cylindrical outer surface of the substrate is directly fixed to the inner surface of the casing by soldering, for example, to ensure lower electrical resistance in the connection between the substrate and the casing, the movement of the substrate caused by the thermal expansion is hindered. This causes excessive thermal stress in the substrate.

Further, as explained later, in the substrate formed as a scroll-like cylindrical laminated assembly, the substrate, when heated, moves in a radial direction as well as an direction due to thermal expansion of the center electrode.

Therefore, it is difficult to firmly fix the substrate formed as a scroll-like cylindrical laminated assembly to the casing in such manner that a low electrical resistance in the connection between the casing and the substrate is maintained while allowing movement of the substrate relative to the casing.

SUMMARY OF THE INVENTION

In view of the problems set forth above, an object of the present invention is to provide a support construction for the scroll-like cylindrical laminated assembly type substrate of an electrically heated catalytic converter which is capable of fixing the substrate to the casing while ensuring low electrical resistance in the connection and without generating excessive thermal stress in the substrate.

The above object is achieved by an electrically heated catalytic converter of the present invention, in which the electrically heated catalytic converter comprises a substrate of a catalyst formed on a scroll-like cylindrical laminated assembly of thin metal sheens wound around a central axis, a cylindrical metal casing disposed in an exhaust gas passage of the engine, and accommodating the scroll-like laminated assembly of the thin metal sheets, a rod like center electrode having two ends, the rod like center electrode being connected to the laminated assembly at one end, extending from the laminated assembly along the central axis, bending towards the wall of the cylindrical casing, and being fixed to the cylindrical casing at the other end, and a buffer means, made of conductive material, having two ends which are fixed to the casing and the scroll-like cylindrical laminated assembly, respectively, the buffer means connecting the laminated assembly and the casing in such manner that the amount and direction of the displacement of the laminated assembly relative to the casing caused by the thermal expansion of the buffer means become equal to the amount and direction of the displacement of the laminated assembly relative to the casing caused by the thermal expansion of the center electrode.

Since the substrate of the present invention is fixed to the casing firmly via the buffer means, the substrate is firmly supported by the casing. Also, since the buffer means is made of conductive material, the electrical resistance in the connection between the substrate and the casing is very low.

Further, in the present invention, the buffer means is also exposed to the high temperature exhaust gas during the engine operation and expands itself. Therefore, the substrate is displaced by the thermal expansion of the buffer means. Since the amount and the direction of the displacement of the substrate caused by the thermal expansion of the buffer means is the same as the amount and the direction of the displacement caused by the thermal expansion of the center electrode, the displacement of the substrate is not hindered by the buffer means. Thus, excessive thermal stress is not generated in the substrate.

BRIEF DESCRIPTION OF THE DRAWINGS

The present invention will be better understood from the description, as set forth hereinafter with reference to the accompanying drawings in which.

DESCRIPTION OF THE PREFERRED EMBODIMENTS

Figure 1:
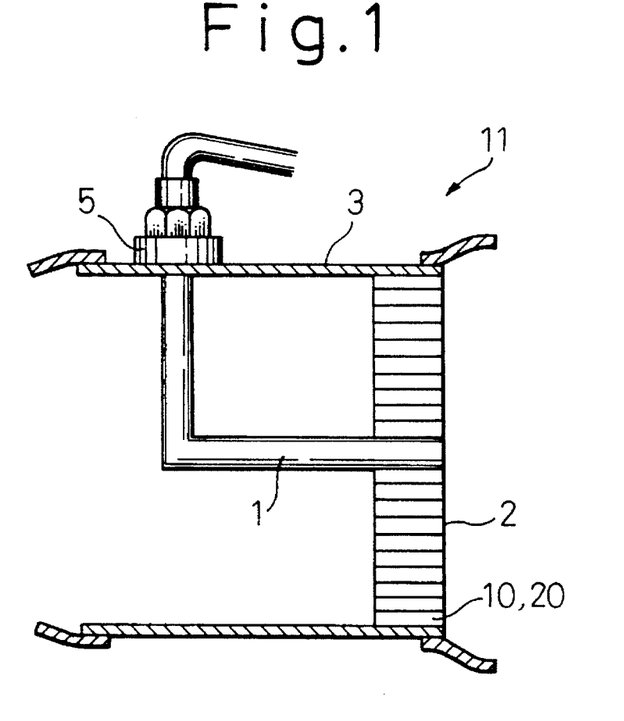
FIG. 1 is a sectional view illustrating the construction of an embodiment of the electrically heated catalytic converter according to the present invention.

FIG. 1 is a typical sectional view of an electrically heated catalytic converter which has a substrate of the scroll-like cylindrical laminated assembly type. In FIG. 1, reference numeral 11 designates an electrically heated catalytic converter as a whole. Numeral 2 is a substrate formed as a scroll-like cylindrical laminated assembly of the metal sheets. Numerals 10 and 20, respectively, designate the plain metal sheet and corrugated metal sheet which constitute the cylindrical laminated assembly 2.

Numeral 1 shows a center electrode disposed at the center of the cylindrical laminated assembly 2. The center electrode 1 is a metal rod type electrode which is made of a material such as a stainless steel, and connected to both the plain metal sheet 10 and the corrugated metal sheet 20. In this embodiment, the center electrode 1 acts as a positive electrode. The cylindrical laminated assembly 2 is accommodated in a metal casing 3. The outside of the cylindrical laminated assembly 2 is connected to the wall of the casing 3 via buffer members (not shown in FIG. 1) as explained later. The metal casing 3 acts as a negative electrode.

As shown in FIG. 1, the center electrode 1 extends from the laminated assembly 2 in axial direction, and is bent toward the wall of the casing 3 by a predetermined angle (such as 90°) as shown in FIG. 1 and penetrates the wall of the casing at the portion 5 so that an electrode 1 wire can be connected to the end of the electrode 1 outside the casing 3. At the penetrating portion 5, the electrode 1 is fixed to the casing 3 via insulating material (of penetrating portion 5) in such manner that the electrode 1 is electrically isolated from the casing 3. As explained later, the fixed portion (penetrating portion) 5 is considered as a reference point for measuring the displacement of the respective portion of the electrode 1 and the laminated assembly 2 caused by the thermal expansion of the electrode 1.

Figure 2:
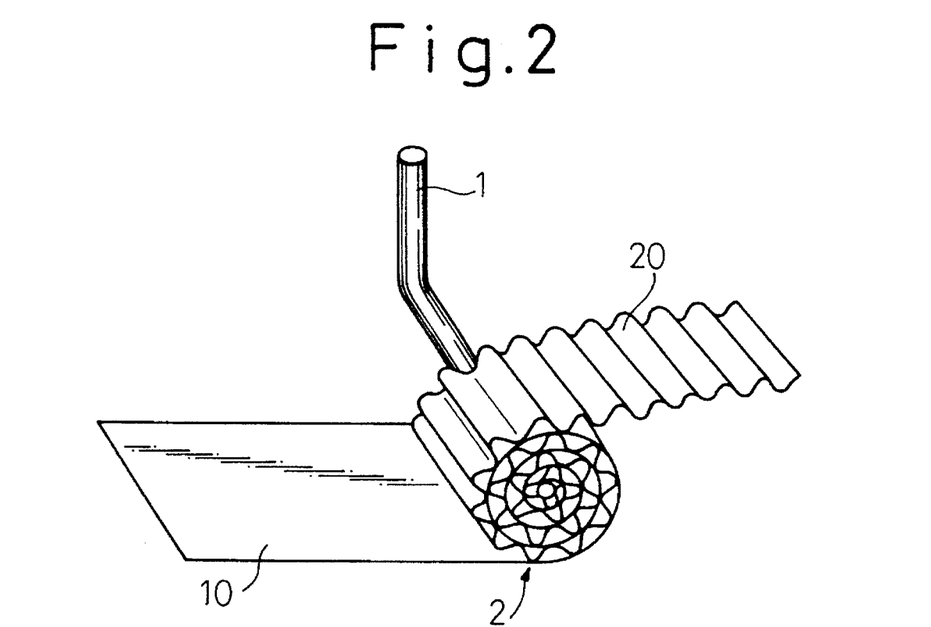
FIGS. 2 is a drawing illustrating the construction of the scroll-like cylindrical laminated assembly of the electrically heated catalytic converter.
Figure 3:
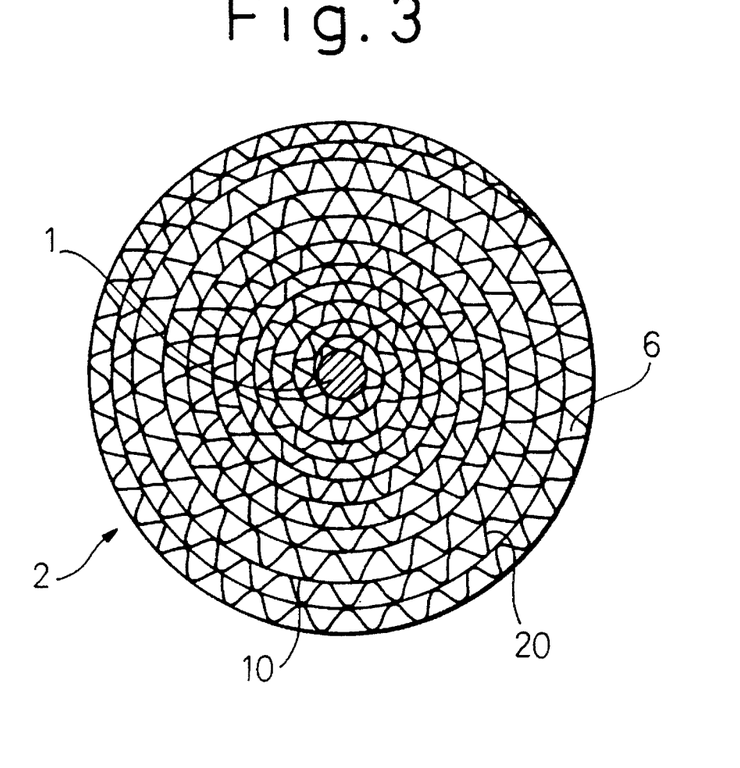
FIG. 3 is a drawing showing a cross sectional view of the laminated assembly in FIG. 2.

FIGS. 2 and 3 illustrate the construction of the cylindrical laminated assembly 2 of FIG. 1. As shown in FIG. 2, the cylindrical laminated assembly 2 is formed by placing the belt shaped plain metal sheet 10 and the corrugated metal sheet 20 one upon the other, attaching the center electrode 1 to the end of the metal sheets 10 and 20 and winding the laminated metal sheets 10 and 20 around the center electrode 1 in such manner that a scroll-like cylinder 2 of the laminated metal sheets 10 and 20 is formed.

FIG. 3 shows a cross section of the cylindrical laminated assembly 2. Since the plain metal sheet 10 and corrugated metal sheet 20 are laminated and wound around the center electrode 1, a number of axial passages 6 which are formed between the plain metal sheet 10 and crests of the corrugated metal sheet 20 are arranged in a spiral around the center electrode 1 in the laminated assembly 2.

As explained later, a catalyst is attached to the surface of the metal sheets 10 and 20. When the casing 3 of the converter 1 is connected to an exhaust passage of an internal combustion engine, the exhaust gas flows through the axial passages 6, and pollutants, such as HC, CO and $NO_x$, in the exhaust gas are purified by the catalyst attached to the walls of the passages 6.

Both the plain metal sheet 10 and the corrugated metal sheet 20 in FIGS. 1 through 3 are made of ferrous alloy containing aluminum (such as 75%Fe—20%Cr—5%Al alloy) and have thicknesses of approximately 50 microns. An electrically insulating coating of a metal oxide (such as aluminum oxide (alumina, $Al_2O_3$) about 1 micron thick is formed on the surface of the metal sheets 10 and 20. When forming the laminated assembly 2, the crests of the corrugated metal sheet 20 are fixed to the surface of the plain metal sheet 10 in such manner that the insulating coating is preserved. Since the insulating coating of $Al_2O_3$ is also used as a carrier for the particles of the catalyst, if a raw metal sheets (i.e., metal sheets having no insulating coating) are used to form the laminated assembly 2, the whole laminated assembly 2 is baked in oxidation atmosphere after the assembly, to produce $Al_2O_3$ layer on the surface of the metal sheets 10 and 20. The catalyst components, such as platinum Pt, rhodium Rh, and palladium Pd are impregnated into the $Al_2O_3$ layer after the laminated assembly 2 is formed.

When the engine starts, a voltage is applied across the center electrode 1 and the casing 3 in FIG. 1, and electric current flows through the plain metal sheet 10 and the corrugated metal sheet 20. The plain metal sheet 10 and the corrugated metal sheet 20 are heated by the electric current and temperature of the metal sheets 10 and 20 reaches the activating temperature of the catalyst a short time after the engine starts.

According to the arrangement in FIG. 1 through 3, the catalyst is activated quickly and exhaust purification starts a short time after the engine starts. However, in the arrangement in FIG. 1 through 3, it becomes difficult to support the laminated assembly 2 firmly without exerting thermal stress on the laminated assembly 2, since the displacement of the laminated assembly 2 caused by thermal expansion becomes complicated due to the existence of the center electrode 1.

Figure 4:
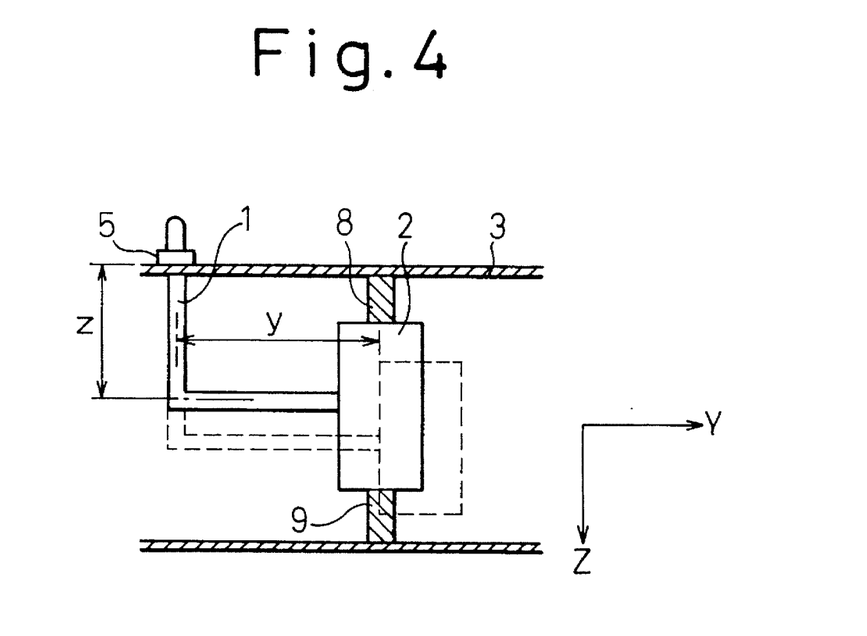
FIG. 4 is a drawing schematically illustrating the displacement of the laminated assembly caused by the thermal expansion of the center electrode.

FIG. 4 illustrates schematically the displacement of the laminated assembly 2 in FIG. 1 during the engine operation. During the operation of the engine, the center electrode 1 and the laminated assembly 2 are directly exposed to high temperature exhaust gas. Further, heat is generated by the oxidation of the HC, CO in the exhaust gas. Therefore, the temperature of the center electrode 1 and the laminated assembly 2 becomes high. Thus, the amounts of the thermal expansions of the center electrode 1 and the laminated assembly 2 are relatively large. On the other hand, the temperature of the casing 3 is relatively low because the casing 3 is cooled by the atmospheric air outside of the casing. Therefore, the amount of the thermal expansion of the casing 3 is relatively small.

The dotted lines in FIG. 4 indicate the displacements of the center electrode 1 and the laminated assembly 2 during the operation of the engine. The center electrode 1 has a portion of length y (FIG. 4) extending along the central axis of the laminated assembly 2 and a portion of length z extending in a radial direction. Further, the end of the center electrode 1 is fixed to the casing 3 at the penetrating portion 5. Therefore, when the center electrode 1 expands, the free end of the center electrode 1 is displaced in both the Y and the Z directions in FIG. 4 simultaneously. The laminated assembly 2 which is fixed to the free end of the center electrode 1, also moves in the Z direction as well as in the Y direction in FIG. 4.

If the laminated assembly 2 is fixed to the casing 3 using, for example, an upper supporting member 8 and a lower supporting member 9 as shown in FIG. 4, a shearing stress in the direction opposite to Y and a tension stress in the direction opposite to Z are exerted on the laminated assembly 2 by the upper supporting member 8, while a shearing stress in the direction opposite to Y and a compression stress in direction Z are exerted on the laminated assembly 2 by the lower supporting member 9. Due to these stresses, damage to the laminated assembly may occur. Especially, at the lower support member 9, the amount of the displacement of the laminated assembly 2 in radial direction is relatively large since radial expansion of the laminated assembly 2 is added to the radial displacement of the center electrode 1, and the compression stress exerted by the lower supporting member becomes large.

Therefore, to avoid excessive stress on the laminated assembly 2, the laminated assembly 2 must be supported by the casing 3 in such manner that the displacement of the laminated assembly 2 in both the Y and z directions are not hindered by the supporting members.

Figure 5:
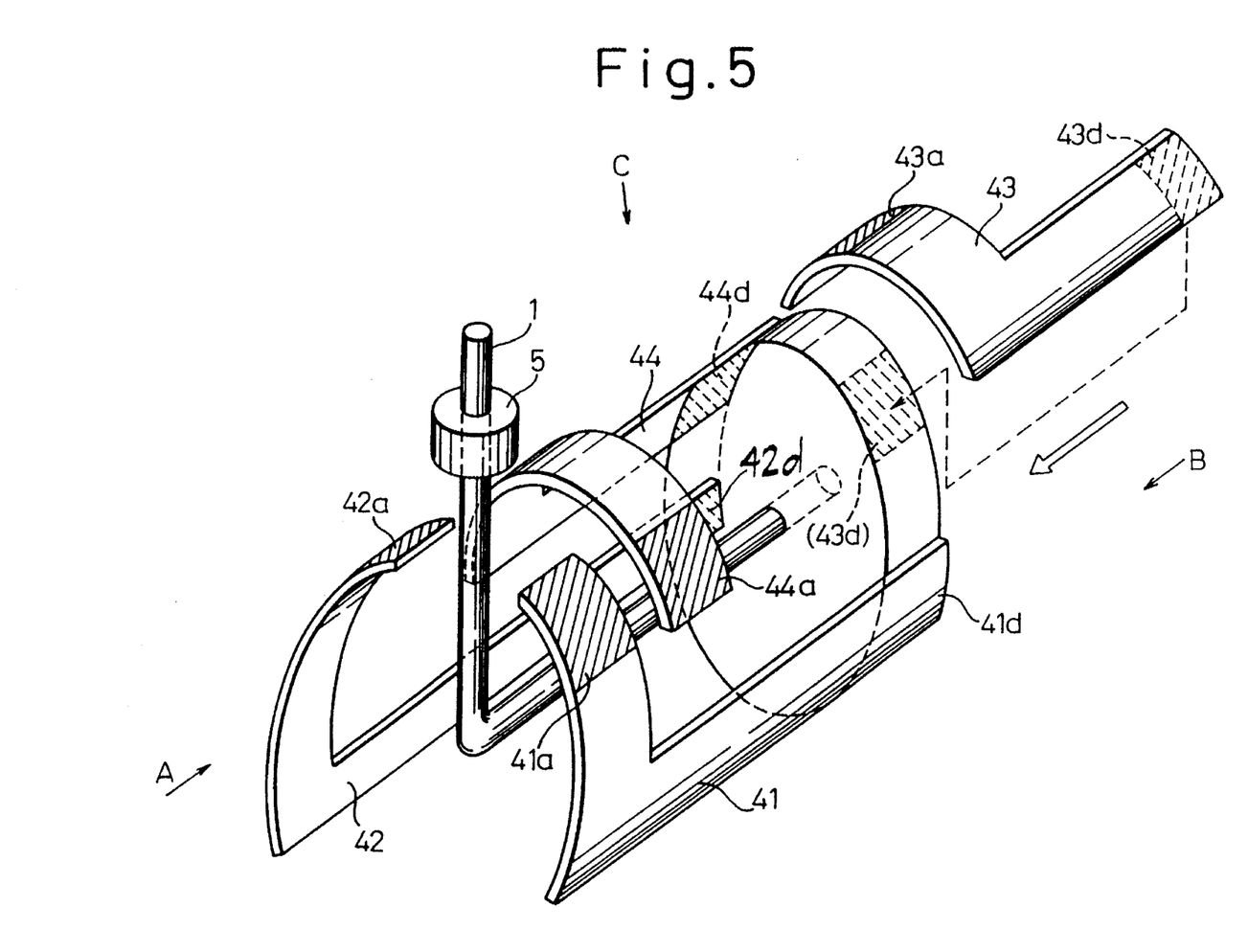
FIG. 5 is a perspective view of the buffer members and their arrangement in a embodiment of the present invention.

In this embodiment, the four buffer members 41 through 44, as shown in FIG. 5, are used to solve this problem. FIG. 5 is a perspective view of the support construction of the laminated assembly 2 in this embodiment. In FIG. 5, the casing 3 is not shown to make the buffer members 41 through 44 visible, also the buffer member 43 is indicated as being offset from its actual position for the purpose of explanation. In the actual arrangement, the buffer member 43 is disposed in a position offset from the position shown in FIG. 5 in the direction indicated by the arrow in FIG. 5. The buffer members 41 through 44 are made of a material having the same value of the thermal expansion coefficient as the center electrode 1, and in this embodiment, the buffer members are made of the same stainless steel as the center electrode 1. As shown in FIG. 5, each of the buffer members 41 through 44 consists of an L shaped plate which is curved in a circular arc in such manner that it forms a part of a cylindrical surface having a central axis parallel to the longer section of the L.

The ends of the shorter sections of the buffer members 41 through 44 are attached to the casing at a portion near the penetration point 5 of the center electrode 1, for example, by soldering (in FIG. 5, hatched portions 41a through 44a of the respective buffer members indicate the portions soldered to the casing 3). On the other hand, the ends of the longer sections 43d and 44d of the buffer members 43 and 44 are attached to the outside of the laminated assembly 2 close to the penetration point 5 (i.e., in FIG. 5, on the upper part of the outside). Further, the ends of the longer sections 41d and 42d are attached to the outside of the laminated assembly 2 at the side far from the penetration point 5 (i.e., on the lower part of the outside, in FIG. 5). Thus the laminated assembly 2 is firmly supported by the buffer members 41 through 44.

Figure 6:
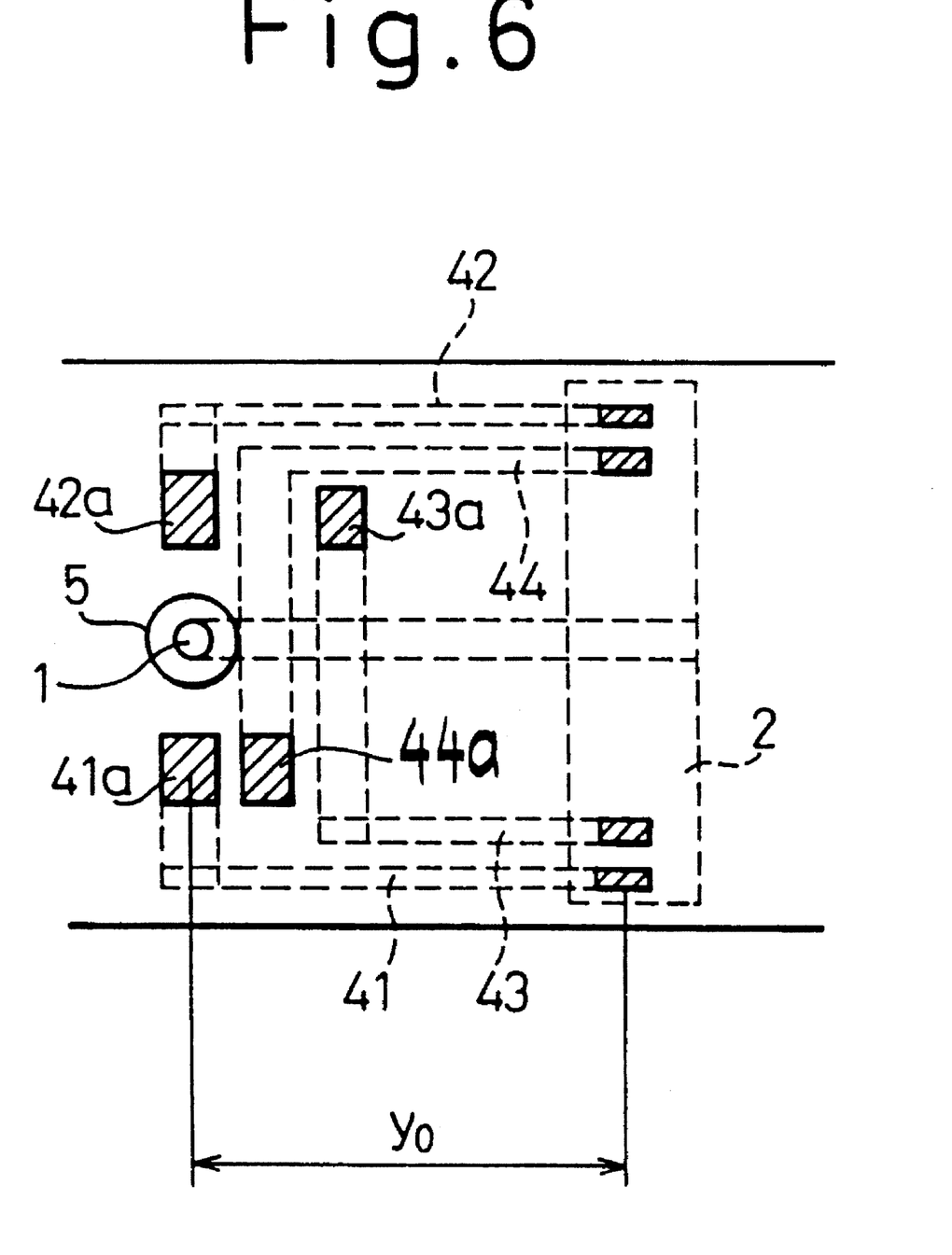
FIGS. 6 and 7A, 7B are drawings illustrating the arrangement of the buffer members relative to the center electrode and the laminated assembly.
Figure 7A:
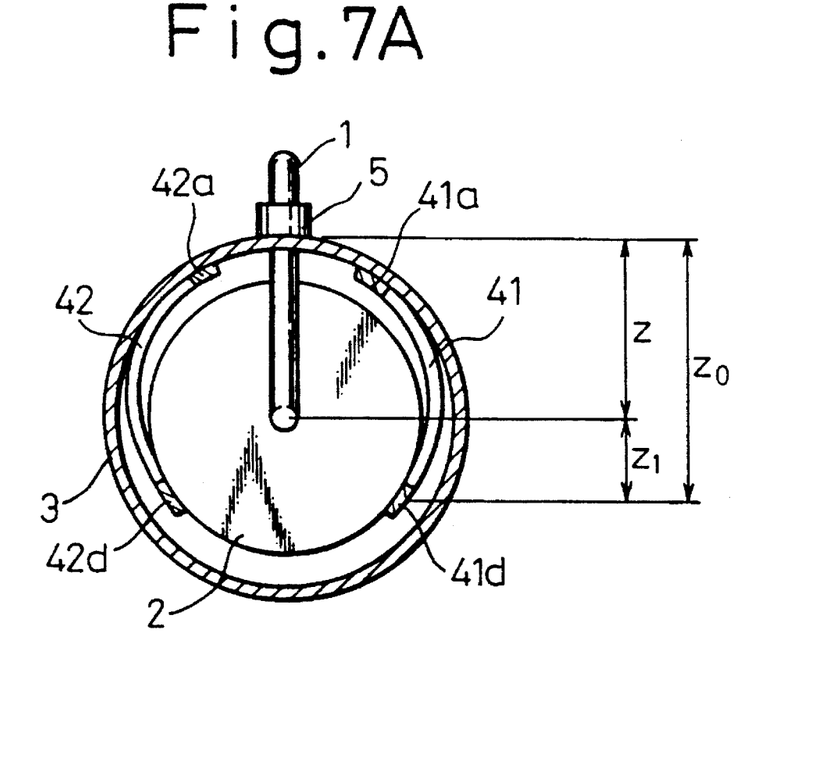
Figure 7B:
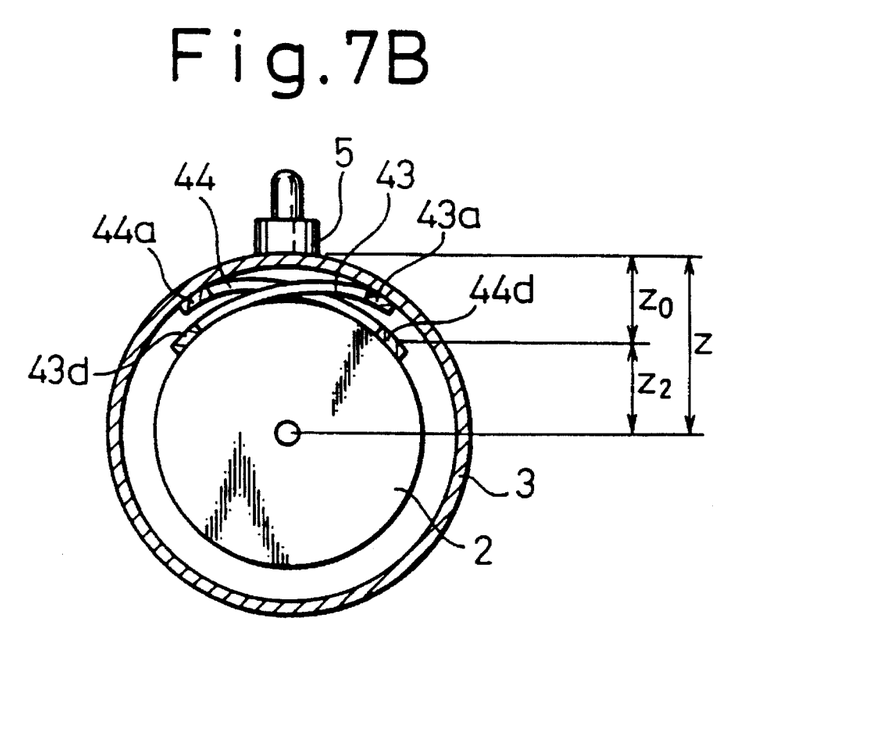

FIGS. 6 and 7A, 7B show the positions of the buffer members attached to the casing 3 (41a through 44a) and to the laminated assembly 2 (41d through 44d). FIG. 6 shows a view along the direction indicated by the arrow C in FIG. 5. FIGS. 7A and 7B show views along the direction indicated by arrows A and B in FIG. 5 respectively As shown in FIG. 6 the portions 41a through 44a of the buffer members 41 through 44 at which the buffer members are attached to the casing 3 are positioned in close proximity to the penetration point 5 at which the center electrode 1 is fixed to the casing 3. Therefore, in the respective buffer members, the distance along the axial direction (direction Y in FIG. 4) between the portions attached to the casing 3 (41a through 44a) and the portions attached to the laminated assembly 2 are substantially the same as the length of the center electrode 1 along the axial direction (indicated by y in FIG. 4).

Now the thermal expansion of the respective elements along the axial (Y) direction are considered.

For example, the distance $y_0$ between the portion 41a (which is attached to the casing 3) and the portion 41d (which is attached to the laminated assembly 2) along the Y direction is nearly the same as the length y in FIG. 4. Since the center electrode 1 and the buffer members are made of the same material, the values of the coefficient of the thermal expansion are also the same. Further, the center electrode 1 and the buffer members reach the same temperature during the operation of the engine. Therefore, the amount of the thermal expansion of the buffer member 41 along the axial (Y) direction is also the same as the amount of the thermal expansion of the center electrode 1 along the axial direction. This means that the amount of the displacement of the laminated assembly 2 along the Y direction caused by the thermal expansion of the center electrode 1 becomes nearly equal to the amount of the thermal expansion of the buffer member 41 along the Y direction. Therefore, the displacement of the laminated assembly 2 in the Y direction caused by the thermal expansion of the center electrode 1 is not hindered by the buffer member 41. This is also true for the buffer members 42 through 44. Thus, the axial movement of the laminated assembly 2 caused by the thermal expansion of the center electrode 1 during the operation of the engine is not hindered by the buffer members 41 through 44.

Next, the thermal expansion of the respective elements along the direction perpendicular to the central axis (i.e., z direction in FIG. 4) are considered. First, the thermal expansion of the buffer members 41 and 42 are explained by referring to FIG. 7A. In FIG. 7A (and also in FIG. 7B) the clearance between the laminated assembly 2 and the casing 3 is exaggerated for the purpose of explanation. The portions 41$d$ and 42$d$ at which the buffer members 4EL and 42 are attached to the laminated assembly are located on the lower side of the outside of the laminated assembly 2. Therefore, the distance $z_0$ between the portions 41$d$ and 42$d$ from the penetration point 5 of the casing 3 along the Z direction becomes larger than the length z of the center electrode 1 along the Z direction by $z_1$ as shown in FIG. 7A (i.e., $z_0=z+z_1$). This means that the displacement along the Z direction of the laminated assembly 2 at the portion attached to the buffer members 41 and 42 is a sum of the amount of the thermal expansion of the length z of the center electrode 1 and the amount of the thermal expansion of the length $z_0$ of the laminated assembly 2. However, the length $z_0$ is relatively small, and also the difference between the values of the thermal expansion coefficients of the materials used for the center electrode 1 and the laminated assembly 2 is small (for example, the thermal expansion coefficient of the ferrous alloy used for the metal sheets is about $14\times10^{-6}/°C$., and the thermal expansion coefficient of the stainless steel used for the center electrode and the buffer members is about $18.7\times10^{-6}/°C$.). Therefore, the displacement of the laminated assembly 2 at the portion attached to the buffer members 41 and 42 becomes nearly equal to the amount of the thermal expansion of the length $z_0$ (=$z+z_1$) of the buffer members 41 and 42. Therefore, the displacement of the laminated assembly 2 in Z direction caused by the thermal expansions of the center electrode 1 and the laminated assembly 2 is not hindered by the buffer members 41 and 42.

Next, the thermal expansion of the buffer members 43 and 44 are explained by referring to FIG. 7B.

The portions 43$d$ and 44$d$ at which the buffer members 43 and 44 are attached to the laminated assembly are located on the upper side of the outside of the laminated assembly 2. Therefore, the distance $z_0$ between the portions 43$d$ and 44$d$ from the penetration point 5 of the casing 3 along the Z direction becomes smaller than the length z of the center electrode 1 along the Z direction by $z_2$ as shown in FIG. 7B (i.e., $z_0=z-z_2$). This means that the displacement along the Z direction of the laminated assembly 2 at the portion attached to the buffer members 43 and 44 becomes smaller than the amount of the thermal expansion of the length z of the center electrode 1 since the thermal expansions of the center electrode 1 and the laminated assembly 2 cancel each other out at these portions.

Further, as explained in FIG. 7A, the length $z_2$ is relatively small and the difference in the value of the thermal expansion coefficient of the materials used for the center electrode 1 and the laminated assembly 2 is relatively small. Therefore, also in FIG. 7B, the displacement of the laminated assembly 2 at the portion attached to the buffer members 43 and 44 becomes nearly equal to the amount of the thermal expansion of the length $z_0$ (= $z-z_2$) of the buffer members 43 and 44. Therefore, the displacement of the laminated assembly 2 in the Z direction caused by the thermal expansions of the center electrode 1 and the laminated assembly 2 is not hinder by the buffer members 43 and 44.

As explained above, the displacement of the laminated assembly 2 in both the Y and the Z directions in FIG. 4 are not hindered by any of the buffer members 41 through 44 in this embodiment, since the directions and the amounts of the thermal expansions of the buffer members are the same as the direction and the amount of the displacement of the laminated assembly 2 caused by the thermal expansion of the center electrode 1.

Practically speaking, the portions 41$a$ through 44$a$ are not positioned exactly on the penetration point 5, therefore, the directions and amounts of the thermal expansions of the respective buffer members are not precisely the same as the direction and the amount of the displacement of the laminated assembly 2 during the operation of the engine. However, the difference between the displacement of the laminated assembly and the portions 41$a$ through 44$a$ is small, and can be absorbed easily by deflection of the buffer members. Therefore, excessive stress is not exerted on the laminated assembly 2 by the buffer members.

Though the above embodiment illustrates the example in which the center electrode 1 is bent 90° from the central axis of the laminated assembly 2, the present invention also can be applied to the electrically heated catalytic converter in which the center electrode is bent by the angle other than 90°, i.e., the center electrode may be bent in a sharp angle or an obtuse angle, or, the center electrode may be bent in a circular arc.

Further, although in the above embodiment, four buffer members formed in L shapes are used to support the laminated assembly 2, the number and the shape of the buffer members in the present invention is not limited to the above embodiment. As explained before, the amount of the displacement of the laminated assembly caused by the thermal expansion of the center electrode is determined by the lengths of the center electrode from the penetration point 5 along Y and Z direction (i.e., lengths y and z in FIG. 4). Therefore, when one end of the buffer member is fixed to the casing at the portion in proximity to the penetration point 5 and the other end of the buffer member is connected to the laminated assembly 2, the amounts of the thermal expansion of the buffer member in the Y and Z directions become equal to the displacements of the laminated assembly 2 in the Y and Z directions regardless of the shape of the buffer member. Therefore, buffer members other than L shaped buffer members can be used in the present invention. For example, the buffer member may be the shape in which a longer section and a shorter section are joined in sharp angle instead of 90°. Also, though the buffer members in the above members are formed in L shape in which longer section and the shorter section are joined in 90° angle, the buffer member may be formed in a polygonal shape in which more than three sections are joined in the angle larger than 90°, or may be formed in a shape which connects the casing 3 and the laminated assembly 2 through a circular arc.

I claim:

1. An electrically heated catalytic converter for an engine comprising:

a substrate supporting a catalyst, the substrate being formed as a substantially cylindrical laminated assembly of thin metal sheets wound around a central axis;

a substantially cylindrical metal casing disposed in an exhaust gas passage of an engine, wherein said substrate is supported within the substantially cylindrical metal casing and wherein the substantially cylindrical casing is formed of a material having a first coefficient of thermal expansion;

a center electrode, a first end of which is connected to said substrate, wherein a first portion of the center electrode extends from the first end of the center electrode along the central axis of the substrate, a second portion of the center electrode extending from the first portion of the center electrode towards the substantially cylindrical casing to a second end of the center electrode, the second end of the center electrode being fixed to said substantially cylindrical casing, wherein the center electrode is formed of a material having a second coefficient of thermal expansion and the substrate is formed of a material having a third coefficient of thermal expansion so that, when a temperature within the casing varies relative to a temperature of the casing, the center electrode and the substrate expand relative to the casing and the expansion of the center electrode causes a predetermined amount of displacement of the substrate relative to the casing; and buffer means for coupling the substrate to substantially cylindrical casing so that, when the temperature within the casing varies relative to the temperature of the casing, an amount and direction of displacement of the substrate relative to said substantially cylindrical casing caused by a thermal expansion of said buffer means is equal to the amount and direction the displacement of the substrate relative to said casing caused by the expansion of said center electrode.

2. An electrically heated catalytic converter according to claim 1, wherein said buffer means comprises a plate member made of a material having the second coefficient of thermal expansion, wherein a first end of plate member is fixed to a portion of the casing adjacent the point at which said center electrode is fixed to said casing, and wherein a second end of the plate member is fixed to an outer surface of the substrate which is furthest from the central axis thereof.

3. An electrically heated catalytic converter according to claim 2, wherein said plate member comprises a portion extending in parallel to the central axis of said laminated assembly and a portion extending along a circumference of said laminated assembly.

4. An electrically heated catalytic converter for an engine comprising:

a substrate supporting a catalyst, the substrate being formed as a substantially cylindrical laminated assembly of thin metal sheets wound around a central axis;

a substantially cylindrical metal casing disposed in an exhaust gas passage of an engine, wherein cylindrical metal casing and wherein the substantially said substrate is supported within the substantially cylindrical casing is formed of a material having a first coefficient of thermal expansion;

a center electrode, a first end of is connected to said substrate, wherein a first portion of the center electrode extends from the first end of the center electrode along the central axis of the substrate, a second portion of the center electrode extending from the first portion of the center electrode towards the substantially cylindrical casing to a second end of the center electrode, the second end of the center electrode being fixed to said substantially cylindrical casing, wherein the center electrode is formed of a material having a second coefficient of thermal expansion and the substrate is formed of a material having a third coefficient of thermal expansion so that, when a temperature within the casing varies relative to a temperature of the casing, the center electrode and the substrate expand relative to the casing and the expansion of the center electrode causes a predetermined amount of displacement of the substrate relative to the casing;

a first plate member made of a material having the second coefficient of thermal expansion the first plate member being coupled between said casing and said substrate, wherein a first end of the first plate member is fixed to a portion of the substantially cylindrical casing adjacent to a point at which said center electrode is fixed to the casing, and wherein a second end of said first plate member is fixed to an outer surface of the substrate which is furthest from the central axis thereof, the second end of the first plate member being fixed to the outer surface of the substrate at a first point separated from said point at which said center electrode is fixed to the casing by a first distance; and a second plate member formed of a material having the second coefficient of thermal expansion, wherein the second plate member is coupled between the casing and the substrate with a first end of the second plate member being fixed to the casing adjacent to the point at which the center electrode is coupled to the casing and wherein a second end of the second plate member is fixed to the outer surface of the substrate at a second point separated from said point at which said center electrode is fixed to the casing by a second distance, wherein the second distance is less than the first distance.

* * * * *

UNITED STATES PATENT AND TRADEMARK OFFICE
CERTIFICATE OF CORRECTION

PATENT NO. : 5,494,642
DATED : 27 February 1996
INVENTOR(S) : Masakatsu SANADA

It is certified that error appears in the above-indentified patent and that said Letters Patent is hereby corrected as shown below:

| Column | Line | |
|---|---|---|
| 4 | 23 | Change "electrode 1" to --electric--. |
| 6 | 4 | Change "z" to --Z--. |
| 6 | 17 | Delete "value of the". |
| 7 | 16 | Change "z" to --Z--. |
| 7 | 22 | Change "4EL" to --41--. |
| 10 | 5 | After "wherein" insert --said substrate is supported within the substantially--. |
| 10 | 6 | After "substantially" delete "said sub-". |
| 10 | 7 | Delete "strate is supported within the substantially". |

Signed and Sealed this

Thirtieth Day of July, 1996

Attest:

BRUCE LEHMAN

Attesting Officer          Commissioner of Patents and Trademarks